United States Patent [19]

Seiden et al.

[11] 4,048,672
[45] Sept. 13, 1977

[54] SWITCH MATRIX CONTROL AND DISPLAY

[75] Inventors: Lewis J. Seiden, Tappan, N.Y.;
William Landesberg, Norwalk;
Gladstone F. Young, Redding, both of Conn.

[73] Assignee: T-Bar Incorporated, Wilton, Conn.

[21] Appl. No.: 646,580

[22] Filed: Jan. 5, 1976

[51] Int. Cl.² .............................................. G06F 3/00
[52] U.S. Cl. .................................................. 364/200
[58] Field of Search .................................... 340/172.5

[56] References Cited

U.S. PATENT DOCUMENTS 3,226,692  12/1965  Fuller et al. ....................... 340/172.5
3,337,853   8/1967  Harrand ............................ 340/172.5

Primary Examiner—Raulfe B. Zache
Attorney, Agent, or Firm—Dorfman, Herrell and Skillman

[57] ABSTRACT

Various data systems as represented by several processing units have permanent multiple switch connections to a common set of peripheral devices. A coordinating actuator means is provided for each set of switches connecting together a peripheral device and a CPU so that the coordinating actuator means for all possible combinations may be conceived as being arranged in a matrix consisting of columns and rows, along one axis of which are arranged the CPU's and along the other axis of which are arranged the peripheral devices. The present invention provides a panel means having indicator elements arranged in a matrix pattern of columns and rows to simulate the switching matrix so that each column repesents a particular device of one kind, CPU or peripheral device, and each row represents a particular device of the other kind. Associated with each row and column is a manually actuated switch element and between the switch elements and coordinating actuator means are gate means for each of the coordinating actuator means, with two inputs, one from a column and one from a row. Simultaneous signals at the gate means permit activation of the coordinating actuator means to connect the represented devices when there is simultaneous actuation of the manually actuated switch elements in their respective row and column. The gating feature permits either an output signal to directly activate the coordinating actuator means or a coded output designed to actuate a specific remote coordinating actuator means. Such coding may employ "Touch-Tone," ASCII, or other code and the code may be transmitted on the same channel used for data transmission in the data system or on a separate channel.

25 Claims, 9 Drawing Figures

SWITCH MATRIX CONTROL AND DISPLAY

The present invention relates to a data processing switch matrix control device and display which makes it possible to readily interchange connections between various peripheral devices and any one of several data processing devices. The present invention provides clear, compact and simple means of making connections between devices and indicates which connections are currently in existence. Selecting new connections involves simple simultaneous manipulation of switch means representative of the devices intended to be interconnected.

The present invention makes it possible to employ coding techniques which enable both local and remote location of monitoring displays and even use of telephone, or other long lines or radio channels, for control and selecting device combinations. This feature also permits multiple controls and/or display devices associated with the same groups of devices or parts thereof.

The fact that peripheral devices for use with computers are often used only part-time has led to the consideration of the possibility of using the same peripheral devices for multiple central processing units. In order to do this, elaborate switching arrangements have been designed. It has been found that in most situations the reliability of mechanical switches is highly desirable. In particular, electromechanically controlled relays operating a plurality of switch contacts have been found useful to make and break the multiple connections required in interconnected data processing and peripheral devices of a modern computer and do so quickly and reliably. In a typical situation a relay is used to simultaneously operate all switches which connect a central processing unit to a given peripheral device and separate relays are provided for each possible combination of devices. Typical of the relays that have been employed in this application are those manufactured by the assignee of this application, T-Bar Incorporated of Wilton, Conn., such as those shown in U.S. Pat. No. 3,689,856. T-Bar has developed modular multiple contact switching relays with associated circuitry to control device interconnection and, as the technology had advanced has developed plug-in techniques to permit easy servicing and rapid replacement to handle massive switch problems, such as those involved in connecting and disconnecting peripheral devices to CPU's, for example. The control of multiple relays has become complicated.

The present invention is concerned with an orderly display showing which CPU is connected to which peripheral device so that one interested in the use of a particular computer system facility can tell at a glance what equipment is in use and in what manner. Also within, or associated with, the display, the present invention provides the capability of making changes in the computer connections within the computer matrix by simple simultaneous manual actuation of a pair of switches to make connections through previously provided paths. The device has the capability of showing which central processing unit has been selected by a matrix of indicator elements, usually light devices, wherein all indicator elements in a given column or row represent the same device, and CPUs, or data processing devices, are arranged along one axis and the peripheral devices along the other axis. Illumination of an indicator element means that the device represented by its row is connected to the device represented by its column.

The display and control devices of the present invention provide new dimensions of ease of use and change of use of computers and peripherals. A further extension of the device enables multiple displays and/or control devices to be used in different locations but all associated with the same switch matrix which may be either proximately or remotely located. In fact, the device permits the use of telephone wires, or other long lines already in existence, to transmit change orders and report a connection without the necessity of bringing the computer wiring itself into the area of controls.

More specifically, the present invention concerns a display and control system for a switching matrix in a data processing system for indicating and controlling device interconnection. Each interconnecting node of the switching matrix includes a plurality of switch elements operable together by coordinating actuator means to connect a selected data processing device to a selected peripheral device. The invention provides panel means having indicator elements arranged in a matrix pattern of columns and rows. The matrix is so arranged that each column represents a particular device of one kind and each row represents a particular device of the other kind. Activation of the indicator element is accomplished at the same time as connection of the device of one kind represented by the row including the activated indicator element with the device of the other kind represented by the column including the activated indicator element. Gate means is provided corresponding to matrix nodes, each gate means having an output terminal and column and row input terminals. Both the column and the row terminals must be actuated simultaneously to produce an output to the associated coordinating actuator means to cause such actuator means to interconnect its devices. A plurality of manually actuated switch elements, one for each column and one for each row, are each coupled to the appropriate input terminal of each of the gate means in its column or row energizing means associated with each manually actuated switch, whereby simultaneous manual manipulation of a selected manually actuated switch element in a column and such an element in a row will cause interconnection of a specific device of one type with a specific device of another type and simultaneous activation of the corresponding indicator element.

The present invention lends itself to various types of combinations within a given system, all of which is ultimately intended to connect some sort of peripheral type of device to a data processor. The most advantageous use of the system is one in which the parts to be interconnected include at least some which are remote from one another. There can be a situation in which data processors are located at different locations and use peripheral devices at each of the various locations or even other locations. Nevertheless, the switching function remains the same. Where there is an element of remoteness involved, however, the interconnection may involve use of telephone lines or radio channels with modems for coding and decoding signals appropriately to accomplish the required switching procedures at the opposite ends. In still other situations, the switching can sometimes be accomplished remotely through direct transmission lines if the distances are not too great.

Whatever the version of the present invention, the purpose is to provide a control device at a location remote from at least some switching and to provide a display which shows when the selected connection has been completed. Sometimes multiple connections and even sequential connections are required, but they are accomplished by one simultaneous actuation of manually actuated switch elements to make a desired connection. Programming may be such that a disconnection can be accomplished by pushing a single button of one or the other type of device represented by the matrix display and control system.

For a better understanding of the present invention reference is made to the accompanying drawings in which.

Figure 1:
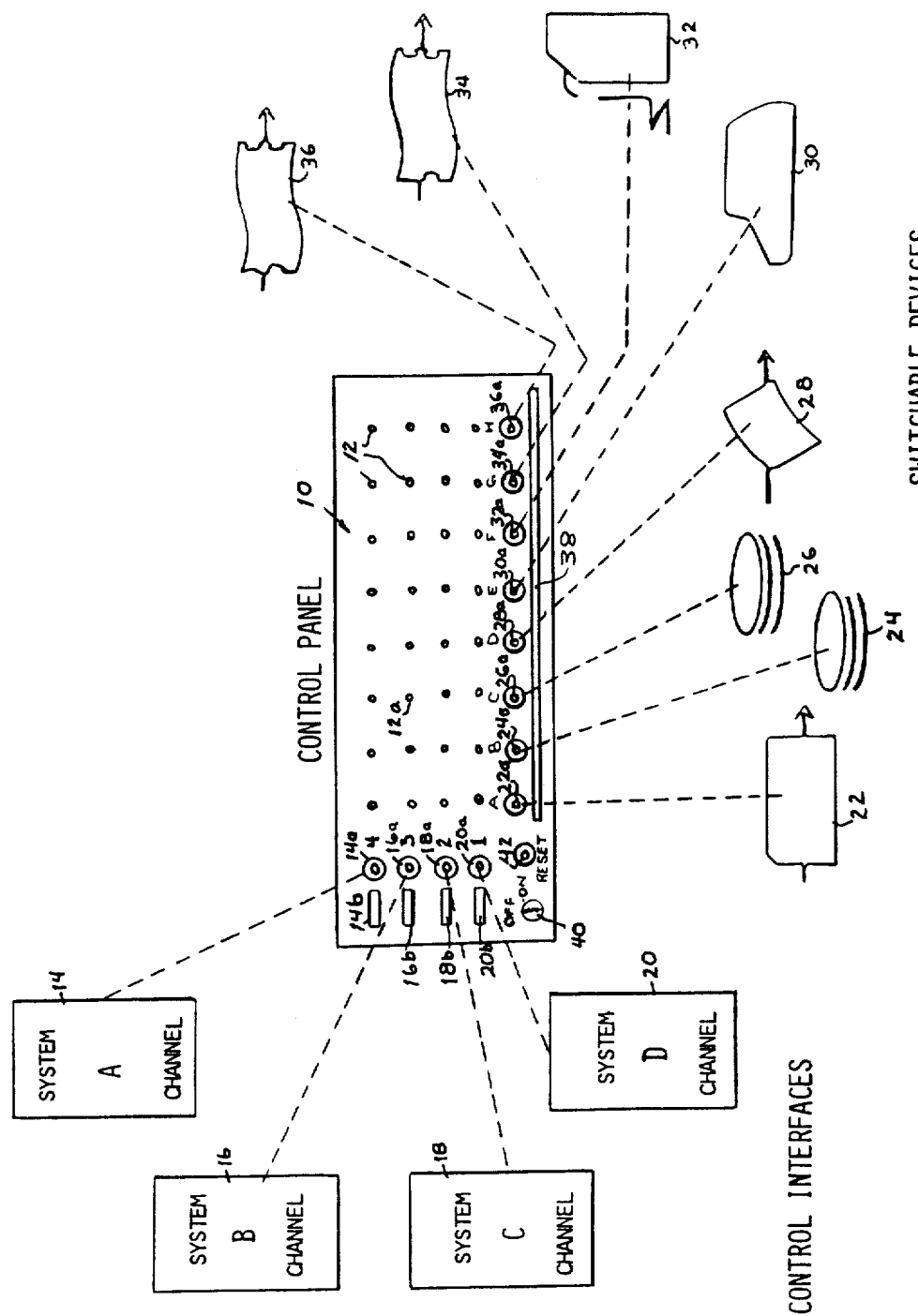
FIG. 1 is a schematic representation of a control panel in accordance with the present invention, showing representative types of devices interconnected by the panel.

Referring first to FIG. 1, the control panel 10 is shown schematically as a matrix 4 × 8 array having a plurality of display elements 12 which may be light emitting diodes, small electric light bulbs or other devices. Illumination or other activation of one of these indicator elements indicates that a particular data processing device has been interconnected with a particular peripheral device. In this case the data processing devices are CPU's represented by blocks 14, 16, 18 and 20. Manually actuated switch elements 14a, 16a, 18a and 20a are arranged in a column at the beginning of each of the four rows of indicator elements representing the respective CPU's. Also correspondingly numbered are labels 14b, 16b, 18b, and 20b indicating which of the CPU's is controlled by each push-button. Thus, all of the indicator elements in the row across from the manual push-button switch 16a are representative of the CPU 16.

The control panel is intended to connect the central processor units to selected peripheral devices which may include data input, data output, data storage and other data handling and manipulation devices 22, 24, 26, 28, 30, 32, 34 and 36. Each of these devices is represented by a column on the control panel 10. At the bottom of each column is a manually actuated switch element, here push-button 22a, 24a, 26a, 30a, 32a, 34a and 36a, which corresponds, respectively, to its correspondingly numbered peripheral device. Labels are preferably provided in strip 38 beneath and corresponding to each push-button 22a, 24a, 26a, 28a, 30a, 32a, 34a and 36a so that the peripheral device being controlled by the corresponding push-button above each label in strip 38 may be immediately identified. In a given control panel, to connect a particular CPU to a particular peripheral device, say CPU 16 to a peripheral device, say memory 26, the push-buttons 16a and 26a are simultaneously depressed and held in closed condition until indicator element 12a becomes illuminated indicating that the devices have been interconnected. Suitable latching is provided within the relay, making the connection by a flip-flop or similar means to hold the connection until it is intentionally released by pressing one of the buttons without the other, for example. The particular release mechanism may vary from panel to panel. If, in a given panel, it is possible to connect several peripherals to a particular CPU, the peripheral push-buttons are the ones which produce the release and logic may be provided to determine which peripherals may be simultaneously connected to a given CPU, such that a combination is rejected if it is improper.

Another feature of the present invention is an off-on switch 40, which is preferably a lock switch may be operated only by a key between "off" and "on" positions. Such a switch constitutes an interlock interposed in the circuit to prevent unauthorized connection between devices or unauthorized disconnection. Without the key switch 40 set to the "on" position, the control panel is not operable. A reset button or a manually controlled switch may also be provided to reset the whole configuration, such that, when it is pushed, all combinations, or at least selected combinations, of interconnected devices are disconnected.

It is understood that in connection with the present invention the interconnection need not be made between data processing devices and peripheral devices which are proximate to one another. The various possibilities of interconnection exist and it will be clear that in addition to permitting remote connections the present invention also permits more than one control panel as well as additional display panels showing the illuminated display matrix without the manually actuated switch elements which allow interconnection.

Figure 2:
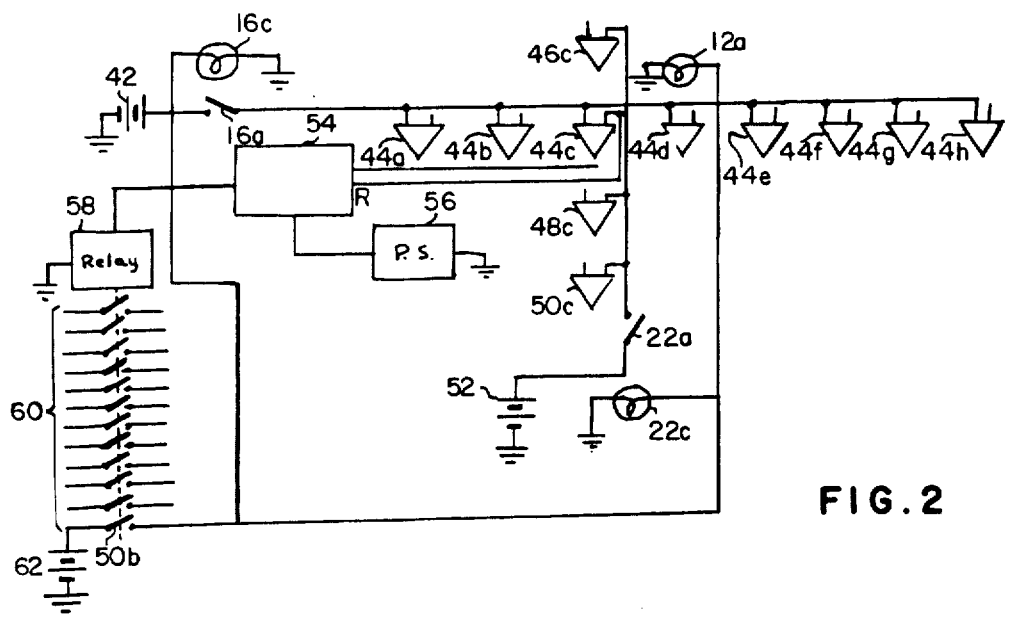
FIG. 2 is a schematic wiring diagram showing one type of circuit which may be employed in connection with the control panel of the present invention.

FIG. 2 is a highly schematic representation of a circuit and specifically only that part of the circuit which has to do with the example of devices selected given in connection with the control of FIG. 1, it being understood that the circuit is duplicated for the various other possibilities throughout the entire system. It will be understood that the circuit shown is entirely schematic and representative of a workable circuit rather than a uniquely suitable one. It is but one of the many which might be used and many other possibilities exist. In FIG. 2 the switches 16a and 22a are shown in open position. When switch 16a is closed, it will apply a potential from power supply 42 to one terminal of each of a plurality of AND gates 44a, 44b, 44c, 44d, 44e, 44f, 44g, 44h. If switch 22a is simultaneously closed it will apply potential from power supply 52 to one of the terminals of each of the AND gates 46c, 44c, 48c and 50c. Since these are two terminal AND gates, the two signals applied at gate 44c will cause an output to a mechanism 54, ultimately connecting power supply 56 to relay 58 to close the plurality of switches 60 which it controls and which have been previously placed in interconnecting paths between CPU device 16 and peripheral memory storage device 26 so that they are ready to operate. The closing of the relay also closes a switch 50b which connects its power supply 62 to illuminate indicator element 12a as well as indicator elements 16c and 22c associated with switches 16a and 22a, respectively. Illumination of indicator elements enables an operator to identify which of the devices are interconnected at a glance.

Relay 58 may be a latching relay so arranged that it will remain latched until push-button 22a is pushed again without push-button 16a being pushed. Alternatively as shown, a secondary connection may be provided to reset a flip-flop, if the control member 54 is a flip-flop instead of a holding relay being employed.

Figure 3:
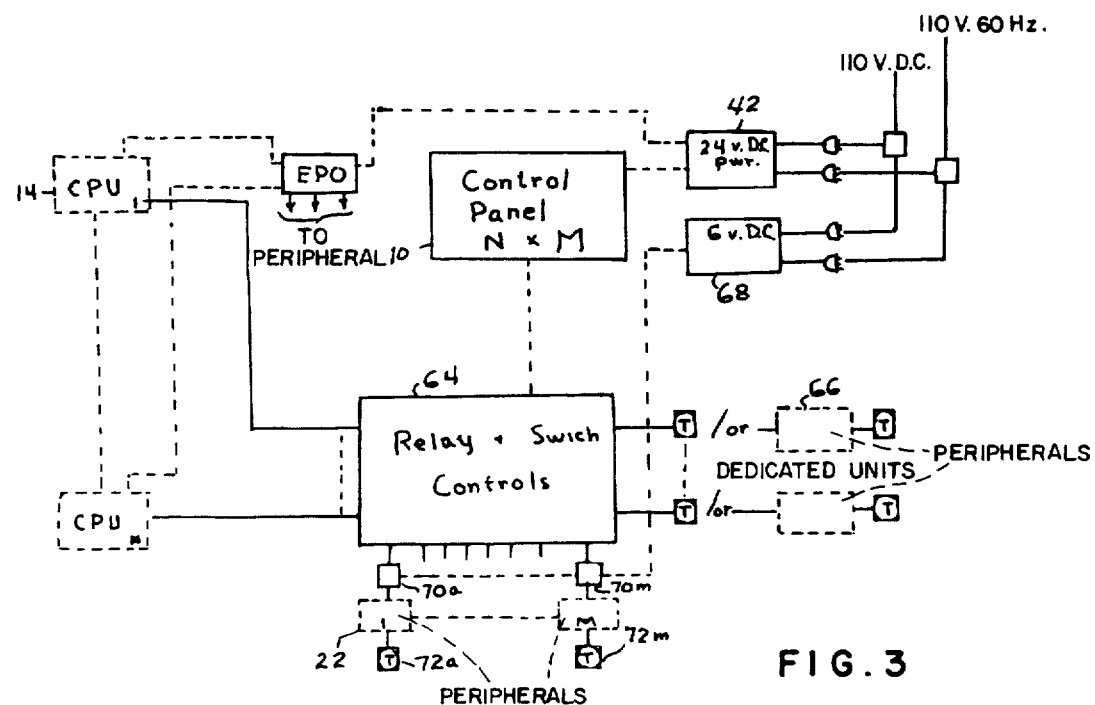
FIG. 3 represents schematically a simple switching system in accordance with the present invention without remote location being a factor.

The overall system involved may be better understood by reference to FIG. 3 in which there is illustrated a control panel and switching relay bank in connection with various other devices which are needed locally to supplement the equipment. As seen in FIG. 3, control panel 10 is generally designated as an N × M matrix panel rather than a 4 × 8 matrix panel, shown in FIG. 1. CPU 1 through CPU N are capable of interconnections to the peripheral devices 1 through M and may include the same or other types of peripheral devices which are represented in FIG. 1 The cabinet 64 may contain control circuitry and it will contain N × M relay devices, each with multiple connections needed to connect each of the CPU's to each of the peripheral devices. Of course, some connections may not be permitted in a relay and, in that event, will not need to be used. Whereever permissbile, connections made through the multiple lines required to connect the peripheral and the CPU are similar to relay 58 in FIG. 1. There may also be relays provided which, when actuated, always connect a given peripheral 66 to a given CPU, in which case the peripheral is considered a "dedicated unit" or device for use by only that CPU to which it is connected, and a single relay will suffice to make its only connection. Such dedicated systems, as typified by peripheral device 66, may or may not be used in a given installation. As will be clear from power supplies 42, 52, 62 in FIG. 2, at least one power supply is required for the control panel 10. If the power supplies are all one potential, i.e., 24 volts DC, a single power supply 42 can be used for all purposes, with suitable safeguards being provided against circulating signals, and the like. As indicated it is usually desirable to provide redundant supplies in case one power supply fails and to provide some sort of warning lights which operate in case of failure of one of the supplies so that it may be replaced or repaired. FIG. 3 also shows additional power supply, in this case, 6 volt DC redundant supply 68, used to operate drivers 70a, through 70 m. These may be necessary to operate the peripheral or they may power Modems 72a through 72m which generate and transmit a coded signal, either through a radio channel or over telephone lines, to a remote unit where they may be reconstituted in terms which are useful in a local set.

Figure 4A:
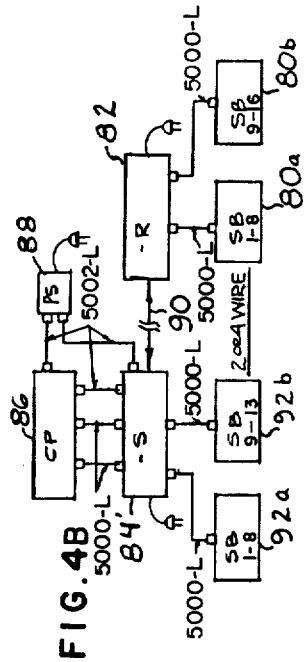
FIGS. 4A, 4B, 4C, 4D, 4E and 4F represent remote switching situations with different combinations of display and control systems in accordance with the present invention.

FIGS. 4A through 4F are representative of different types of situations in which there are positions remote from one another, involving one or more control display panels and, in some cases, switch boxes in different locations. FIGS. 4A through 4F should be understood to show only part of the total system of FIG. 3, that is, the devices which are interconnected are not shown, but only the parts related to switching and either controlling the switching function or displaying the fact that the switching function has been completed are shown. For example, FIG. 4A shows the switch boxes 80a and 80b of a Modem receiver 82 which receives its signals by a two or four wire transmission line or equivalent radio signals from send modem 84 (which also doubles as a display initiator). In this case, the control panel 86, corresponding to control panel 10 in the previous figures, is provided with a power supply 88 and operates in the manner described by simultaneous pressing of manual switch element to select a given relay. The selection is translated into a teletype code, for example, and transmitted over the line 90 to receiver 82 to where it is reconstructed into a signal to actuate the selected relay in switch boxes 80a and 80b. The selection in this instance is subject to display logic device 84 which provides the control panel with signals to illuminate the proper indicator elements to show the selected interconnection.

Figure 4B:
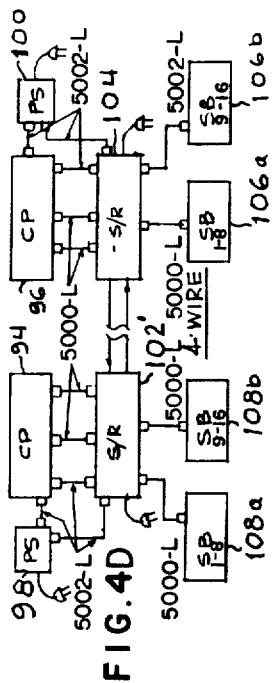

FIG. 4B is a system similar to that of FIG. 4A but in the FIG. 4B devices the send Modem 84 does not include display logic since it is associated with local switch boxes 92A and 92B which provide relays, including switches, to complete circuits to illuminate the proper display element on control panel 86. FIG. 4A, for example, might represent the situation in which all of the CPU's are in one location and all of the peripherals in another, whereas FIG. 4B might suggest that some of the peripherals are in the same location as the CPU's while others are remotely located, or perhaps the peripherals are located in one place and the CPU's distributed.

Figure 4C:
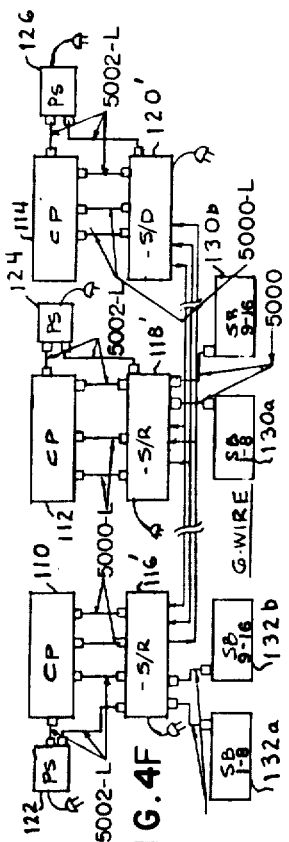
Figure 4D:
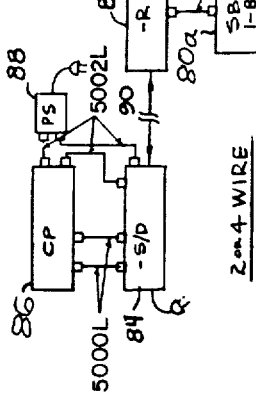

FIG. 4C is a bit more complicated system which may represent two remote locations, each having a control panel 94 and 96 with its own power supply 98, 100, each having switch signal processors 102, 104. Processor 104, however, feeds switch boxes 106a and 106b directly, whereas, processor 102 has to rely on a modem, or other means of transmitting Touch Tone or other coded signals, across a four wire transmission line, or the equivalent. Both devices 102 and 104 have modems since both are capable of sending and receiving signals in a preferred embodiment. The return signal from device 104 may indicate completion of a particular interconnection for the display logic in control device 102, or the display, again, may be a local display, as it was in the FIG. 4A construction, with its own internal logic which presumes compliance with instructions. The system of FIG. 4D is similar to that of 4C, except that it is a completely symmetrical system in which the send display device 102 is replaced by a send/receive device 102' operating local switch boxes 108a, 108b in a system, in this respect, similar to that of FIG. 4B.

Figure 4E:
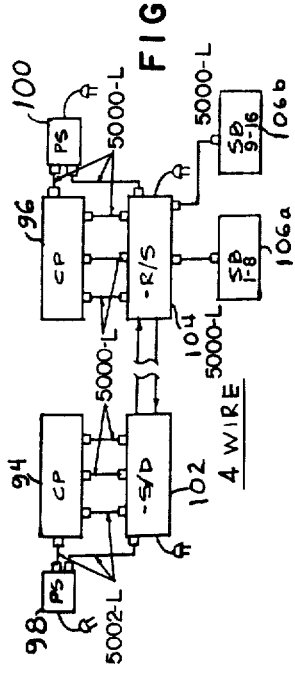

FIG. 4E expands the system still further to a three location system, each location having a control panel 110, 112, 114, and control logic and other circuitry in devices 116, 118, 120, respectively. Each of the systems also has local power supply 122, 124, and 126, respectively. Only the stage employing control panel 114 and logic device 120, which involves a send/receive system, employs switch boxes 128a and 128b, respectively. In order to enable interconnection from each of the three localities to the other, a six wire system, or an equivalent radio channel system is employed. Again, a given relay may be selected at any of the stations and if selected at the control panel 110 or 112, the logic in device 116 or 118 includes a modem transmitter which will code a signal to be decoded by receiver in device 120 and reconstructed for use by the proper relay and switch boxes 128a and 128b. The systems may include display logic and controls in device 116 and 118 for their respective control panels 110 and 112 in order to illuminate the proper display elements. Alternatively, they may receive appropriate signals back from the transmitter/receiver 120 and, after decoding, produce essentially the same results.

Figure 4F:
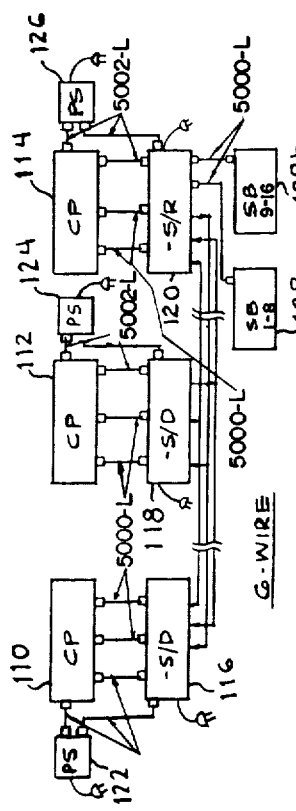

FIG. 4F shows a system similar to that of system of FIG. 4E and bears the same number designators but replaces the switch boxes 128a and 128b with switch boxes 130a, 130b and 132a and 132b coupled, respectively, to controls 118' and 116'. Controls 118' and 116' are now redesignated sender/receivers and the control 120' a sender/display.

From the systems shown, it can be seen that all sorts of possibilities exist. It is possible, for example, to have displays instead of control panels, in which event the means of interconnecting devices and changing those interconnections are removed from the display panel, and the display simply shows which devices are interconnected. Other types of codes can be used, for example, the ASCII code may be used instead of Touch-Tone (a registered trademark). Selections of the code will depend upon such things as whether data, in addition to switching information, is transmitted over the switching communications channel or lines. All sorts of coding possibilities exist, of course, within the skill of the art. Similarly, all sorts of combinations of systems with all sorts of switch locations and control panel locations exist.

The modifications described are but few of the possibilities and others will occur to those skilled in the art. All such modifications within the scope of the claims are intended to be within the scope and the spirit of the present invention.

We claim:

1. A display and control system for a switching matrix in a data processing system for indicating and controlling device interconnection, each interconnecting node of the switching matrix including a plurality of switch elements operable together by coordinating actuator means to connect a selected data processing device to a selected peripheral device, comprising,
    panel means having indicator elements arranged in a matrix pattern of columns and rows, the matrix being arranged so that each column represents a particular device of one kind and each row represents a particular device of the other kind,
    gate means corresponding to matrix nodes, each gate means having an output terminal and column and row input terminals, both of which input terminals must be energized simultaneously to produce an output at the output terminal,
    output coupling means connecting each gate means with associated coordinating actuator means and responding to an output at the output terminal of the gate means to cause such actuator means to interconnect its devices,
    a plurality of manually actuated control switches, one for each data processing device and one for each peripheral device, each coupled to the appropriate input terminal of each of the gate means in its column or row,
    energizing means associated with each manually actuated control switch whereby simultaneous manual manipulation of a selected pair of manually actuated control switches in a selected column and in a selected row will cause the gate means to generate an output causing interconnection of a specific device of one type with a specific device of another type, and circuit means responsive to the manual actuation of the control switches for activating that indicator element in the panel means representative of the devices interconnected thereby.

2. The system of claim 1 in which the manually actuated control switches will not function until an interlock is turned on.

3. The system of claim 2 in which the interlock is a key and lock actuated switch means.

4. The system of claim 1 in which at a selected place in the circuitry, between the respective control switches and the selected coordinating actuator means, at least one circuit includes compatible code generating means, transmission means, and decoding means as a series link in the intermediate circuit.

5. The system of claim 4 in which the code generating means receives various outputs from the gate output terminals and converts them to coded signals, the transmission means carries the coded signals to the decoding means which decodes the respective signals to supply an actuating signal to the selected one of the coordinating actuator means.

6. The system of claim 5 in which the code generating means and the decoding means produce and respond to Touch-Tone coding.

7. The system of claim 5 in which the code generating means and the decoding means produce and respond to ASCII coding.

8. The system of claim 4 in which the transmission means includes long conductive lines.

9. The system of claim 4 in which the transmission means includes radio transmitter and radio receiver means.

10. The system of claim 1 in which the manually actuated control switches are located on the panel means in the respective columns and rows associated with the respective data processing device or peripheral device with which each control switch is associated.

11. The system of claim 10 in which there is at least one additional panel means for display only having indicator elements arranged in a matrix pattern of columns and rows, the matrix being arranged so that each column represents a particular device of one kind and each row represents a particular device of the other kind and means to activate each of the appropriate indicator elements as devices represented are interconnected and deactivate that indicator element as said devices are disconnected.

12. The system of claim 10 in which there are a plurality of panel means having both indicator elements and control switches.

13. The system of claim 10 in which there is at least one additional panel means for display only having indicator elements arranged in a matrix pattern of columns and rows, the matrix being arranged so that each column represents a particular device of one kind and each row represents a particular device of the other kind and circuit means to activate each of the appropriate indicator elements as devices represented are interconnected and deactivate that indicator element as said devices are disconnected.

14. The system of claim 13 in which there are a plurality of additional panel means for display only.

15. The system of claim 14 in which there are a plurality of panel means having both indicator elements and control switches.

16. The system of claim 13 in which at least two panel means locations between which transmitter and receiver transmissions links are employed.

17. The system of claim 16 in which there are in different locations a plurality of panel means having both indicator elements and control switches and transmitter and receiver links between them are bidirectional.

18. The system of claim 16 in which code generating and decoding means are employed in each of the transmitter and receiver links.

19. The system of claim 1 in which separate indicator elements are provided representative of each of the respective data processing devices and peripheral devices in the respective columns and rows representative of said respective devices, and circuit means, responsive to the manual actuation of the control switches, are provided for activating those indicator elements in the panels representative of the devices interconnected thereby upon manual manipulation of associated control switch which actuates a coordinating actuator.

20. The system of claim 19 in which the indicator elements are illuminated and the colors of those indicating a matrix connection are different from those indicating the respective devices interconnected.

21. The system of claim 19 in which the illuminated indicators are provided with circuitry whereby they are extinguished upon disconnection of the plurality of switches connected by their associated coordinating actuator.

22. The system of claim 1 in which at least some of the coordinating actuator means are in locations remote from the panel means.

23. The system of claim 1 in which at least some of the coordinating actuator means are in locations remote from the control switches.

24. The system of claim 1 in which elements of the system are located in different places each with suitable transmission means interconnecting the respective locations as required.

25. A display and control system for a switching matrix in a data processing system for indicating and controlling device interconnection, each interconnecting node of the switching matrix including a plurality of switch elements operable together by coordinating actuator means to connect a selected data processing device to a selected peripheral device, comprising, panel means having indicator elements representative of a particular device of one kind grouped together in one group and indicator elements representative of a particular device of the other kind grouped together in a separate group, gate means corresponding to matrix nodes, each gate means having an output terminal and column and row input terminals both of which input terminals must be energized simultaneously to produce an output at the output terminal, output coupling means connecting each gate means with associated coordinating actuator means and responding to an output at the output terminal of the gate means to cause such actuator means to interconnect its devices, a plurality of manually actuated control switches, one for each data processing device and one for each peripheral device, each coupled to the appropriate input terminal of each of the gate means in its column or row, and each located on the panel means in proximitry to its associated control switch, energizing means associated with each manually actuated control switch whereby simultaneous manual manipulation of a selected pair of manually actuated control switches in selected column and in a selected row will cause one gate means to generate an output to the actuator means causing interconnection of a specific device of one type with a specific device of another type, and circuit means responsive to the manual actuation of the control switches for activating those indicator elements on the panel means representative of the respective devices interconnected.

* * * * *

UNITED STATES PATENT OFFICE
CERTIFICATE OF CORRECTION

Patent No. 4,048,672            Dated September 13, 1977

Inventor(s) Lewis J. Seiden, William Landesburg, & Gladstone F. Young

It is certified that error appears in the above-identified patent and that said Letters Patent are hereby corrected as shown below:

Abstract, line 14, "repesents", should be --represents--;

Column 3, line 46, after "16a", insert --next to the label 16b--;

Column 5, line 19, "whereever permissbile", should be --wherever permissible--;

Column 5, line 67, "element", should be --elements--;

Column 5, line 68, "line", should be --lines--;

Column 6, line 58, "device", should be --devices--.

Signed and Sealed this

Twenty-first Day of February 1978

[SEAL]

Attest:

RUTH C. MASON  
Attesting Officer

LUTRELLE F. PARKER  
Acting Commissioner of Patents and Trademarks